(12) United States Patent
Chisnall et al.

(10) Patent No.: US 8,372,321 B2
(45) Date of Patent: Feb. 12, 2013

(54) POLYMERIC MATERIALS

(75) Inventors: David Andrew Chisnall, Merseyside (GB); Mark Frost, Derbyshire (GB)

(73) Assignee: Colormatrix Holdings, Inc., Wilmington, DE (US)

( * ) Notice: Subject to any disclaimer, the term of this patent is extended or adjusted under 35 U.S.C. 154(b) by 0 days.

(21) Appl. No.: 12/519,601

(22) PCT Filed: Dec. 19, 2007

(86) PCT No.: PCT/GB2007/004897
§ 371 (c)(1),
(2), (4) Date: Jun. 17, 2009

(87) PCT Pub. No.: WO2008/078079
PCT Pub. Date: Jul. 3, 2008

(65) Prior Publication Data
US 2010/0044897 A1   Feb. 25, 2010

(30) Foreign Application Priority Data

Dec. 23, 2006 (GB) .................................. 0625890.9
Oct. 16, 2007 (GB) .................................. 0720137.9

(51) Int. Cl.
  B29C 45/76   (2006.01)
  B29C 47/92   (2006.01)
  G01J 3/46    (2006.01)
(52) U.S. Cl. ........................ 264/40.1; 356/402
(58) Field of Classification Search ................ 264/40.1; 356/402
See application file for complete search history.

(56) References Cited

U.S. PATENT DOCUMENTS

| 4,684,488 | A | * | 8/1987 | Rudolph | 264/411 |
| 5,668,633 | A | * | 9/1997 | Cheetam et al. | 356/402 |
| 6,216,878 | B1 | * | 4/2001 | Wheat | 209/509 |
| 6,406,069 | B1 | * | 6/2002 | Martelli | 285/283 |
| 6,719,453 | B2 | * | 4/2004 | Cosman et al. | 366/141 |
| 6,772,151 | B1 | * | 8/2004 | Johnston et al. | 707/700 |
| 7,081,217 | B2 | * | 7/2006 | Treleaven | 264/40.1 |
| 2002/0169513 | A1 | * | 11/2002 | Sherrill et al. | 700/109 |
| 2003/0168758 | A1 | * | 9/2003 | Bickel | 264/40.1 |
| 2003/0184772 | A1 | * | 10/2003 | Agarwal | 358/1.9 |
| 2003/0204410 | A1 | * | 10/2003 | Agarwal | 705/1 |
| 2004/0155374 | A1 | * | 8/2004 | Hutchinson et al. | 264/40.1 |
| 2004/0196461 | A1 | * | 10/2004 | Agarwal et al. | 356/402 |
| 2004/0196462 | A1 |  | 10/2004 | Schultheiss | |
| 2007/0139667 | A1 |  | 6/2007 | Russell et al. | |

FOREIGN PATENT DOCUMENTS

| JP | 2002286548 | 10/2002 |
| JP | 2004532148 | 10/2004 |

* cited by examiner

Primary Examiner — Jill Heitbrink
(74) Attorney, Agent, or Firm — Fay Sharpe LLP

(57) ABSTRACT

A part may be manufactured in a desired color from virgin or recycled polymeric material by selection of a color formulation to be used in a first location 4, 6, 8, 10, 12; relaying color information to a centralized match prediction system 16 as regards the desired color and other information concerning a polymeric material which is to be made in the desired color. The system 16 includes a database and associated software and is able to take the color information and predict how to reproduce the colors using an associated color dispense system. A device 30 controls dispense stations 32, 34, 36, 38 and 40 which may be conveniently situated at customer sites or the like. The dispense stations dispense colors for use.

40 Claims, 1 Drawing Sheet

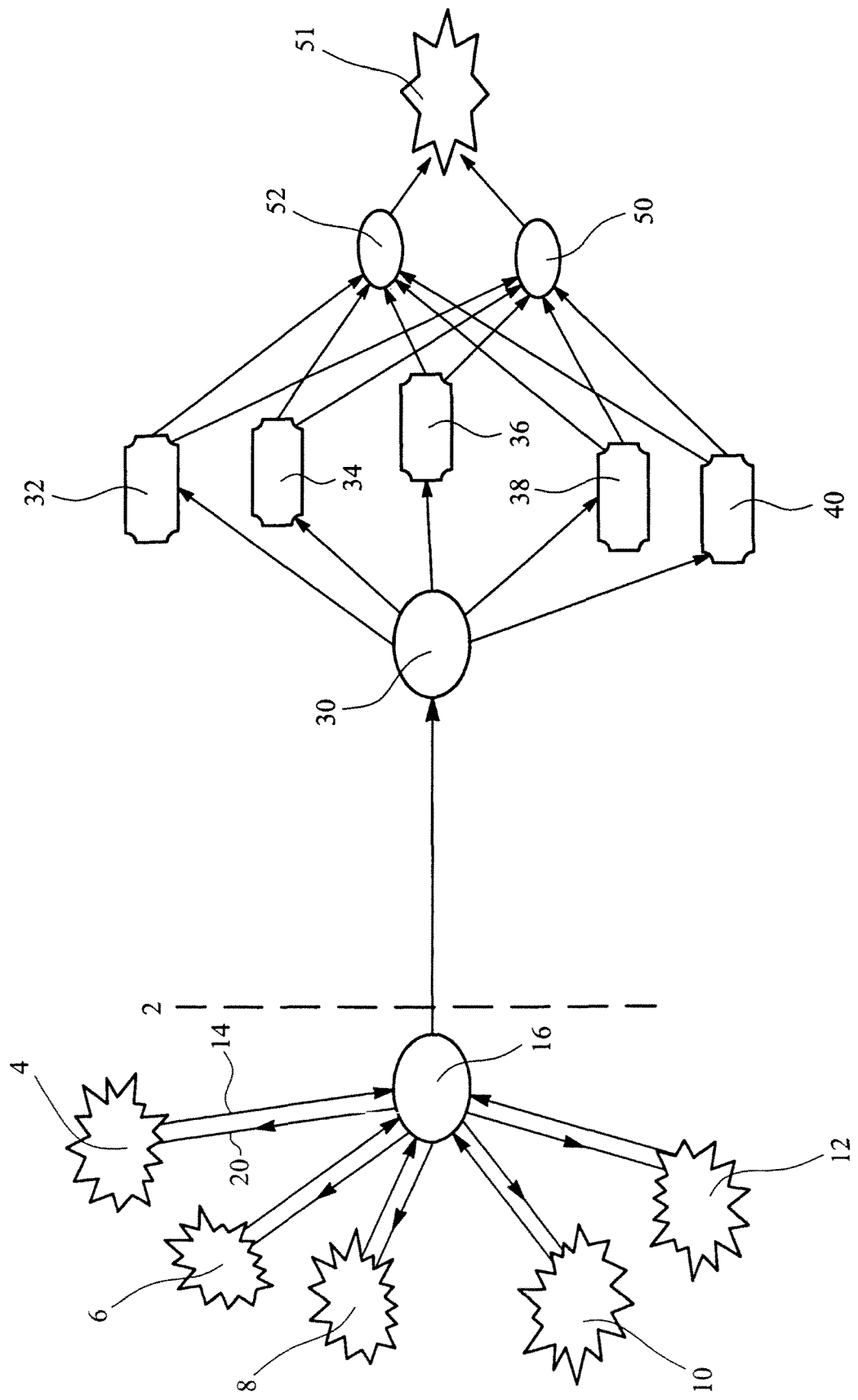

POLYMERIC MATERIALS

This invention relates to polymeric materials and particularly, although not exclusively, relates to the manufacture of coloured parts from such polymeric materials in an extrusion and/or moulding process.

It is very well known to extrude or mould coloured parts from thermoplastics polymeric materials, such as polyesters, polyolefins, styrenic polymers, polycarbonates and polamides. However, it is difficult for manufacturers of such parts to quickly select a colour formulation to be incorporated into a thermoplastic to match, as closely as possible, a specific colour selected by, for example, a designer of the coloured part.

The selection of a colour formulation to match a colour specified by a designer may currently involve the following steps:

(a) A designer selects a colour and specifies it in terms of a known colour system (e.g. RAL or Pantone No.) or provides a swatch or other colour sample of the selected colour;
(b) The colour sample or RAL or Pantone No is sent to a colour formulator who then selects colourants and produces one or more colour formulations comprising selected colourants, in an attempt to reproduce the colour;
(c) One or more sample plaques are then moulded using the colour formulations(s);
(d) The sample plaques are sent back to the designer who considers the plaques and may specify changes (e.g. the colour needs to be lighter/darker, bluer, redder etc);
(e) If changes are required then further colour formulations are prepared and the procedures of steps (c) and (d) are repeated;
(f) Once a final colour formulation has been approved by the designer, parts may be manufactured using the selected formulation.

It will be appreciated that current methods of selecting colour formulations are time-consuming and consequently it is often not easy (or possible within time constraints) for designers to obtain the exact colour they desire because there will be a tendency for a designer to avoid calling for successive changes (i.e. successively repeating steps (b) to (e)).

Another problem associated with providing parts from polymeric materials in a desired colour arises when polymeric material to be used to produce the parts is recycled. For example it may be post-consumer recyclate (PCR) which may comprise for example a range of different recycled nominally clear bottles; or nominally green bottles; or nominally brown bottles. In particular it can be difficult to quickly match the colour of the PCR to a desired colour and may not be commercially viable for small batches of PCR.

It is an object of the present invention to address the above described problems.

According to a first aspect of the invention, there is provided a method of selecting a non-volatile colour formulation for manufacturing, in a selected colour, a part comprising a polymeric material, the method comprising the following steps:

(i) at a first location, determining colour information relating to a desired colour for the polymeric material;
(ii) communicating colour information determined in step (i) to a second location;
(iii) at the second location, determining one or more colour formulations for delivery into a polymeric material to match or closely match the desired colour;
(iv) delivering information relating to the colour formulation(s) determined in step (iii) to an assessment location for assessment;
(v) optionally repeating step (iii) to determine one or more additional colour formulations for delivery into the polymeric material to match or closely match the desired colour;
(vi) the selection of a colour formulation for use in the manufacture of the part.

Said polymeric material may be a thermoplastic or thermoset polymeric material. Preferably, it is a thermoplastic polymeric material.

Said non-volatile colour formulation preferably comprises a non-volatile carrier and one or more pigments or dyes. It is suitably arranged to be dosed into a polymeric material. It is therefore suitably stable and/or is not decomposed at a relevant processing temperature. It is preferably stable when incorporated in a thermoplastic polymeric material which is melt processed for example in an extrusion or injection moulding apparatus. It is preferably stable and/or does not decompose at temperature of less than 150° C., preferably of less than 200° C., more preferably of less than 250° C.

The colour formulation is preferably for use in manufacturing a coloured part comprising a polymeric material for example thermoplastic in a process which comprises heating, for example melt processing, a mixture of a said colour formulation and polymeric material to allow the mixture to be shaped to define the part. The part may be manufactured by extruding and/or moulding, for example injection moulding or compression moulding a mixture comprising polymeric material and a said colour formulation. Over 90 wt %, preferably over 95 wt %, more preferably over 99 wt % of the part may be comprised by a mixture which comprises polymeric material and said colour formulation. Thus, preferably less than 1 wt % preferably substantially none of the mixture is lost (e.g. evaporates) during processing.

The part may have a thickness in at least one direction of at least 1 mm, preferably at least 3 mm, more preferably at least 1 cm. The part is preferably substantially homogenous (e.g. comprising colour dispersed homogenously throughout the polymeric material) across the extent of said at least one direction.

In step (i) of the method, colour information may be determined by selecting an identifier of a colour in accordance with a defined colour system (e.g. RAL or Pantone) or a colour spectrum of the desired colour may be determined. The latter is preferred. When an identifier of a colour in a defined colour system is selected, the identifier may be converted into colour data, for example a colour spectrum.

In step (i), the method may comprise spectrophometrically assessing the desired colour to determine said colour information. This may be done using a portable spectrophotometer (e.g. a hand held unit) or may be done using a substantially immobile spectrophotometer. The method may therefore comprise a step (i) which comprises presenting a sample of a desired colour to a spectrophotometer to determine its spectrum in the visible region. The spectrum in the IR and UV regions may also be determined.

The first location may be a customer's premises or premises of a designer of the part.

In step (ii), said colour information is preferably communicated to a second location which is remote from said first location. For example, said first and second locations may be more than 10 or 100 miles away from each other; they may be in different towns or countries.

In step (iii), said one or more colour formulations may be selected having regard to one or more of the following variables, in addition to the variable of colour information:
(a) the identity of the polymer into which the colour formulation is to be incorporated. For example, the polymer may be virgin polymer; or it may be recycled polymer, for example PCR.
(b) the grade of polymer into which the colour formulation is to be incorporated;
(c) the processing conditions to which the polymer into which the colour formulation is to be incorporated will be subjected. Such processing conditions may be relevant to heat stability requirements of materials in the colour formulation;
(d) the use and/or requirements of the part for which the colour formulation is to be selected, for example, the light fastness, weather fastness, chemical resistance (when in contact with other parts or products such as fluids);
(e) country of use. In this case, a colour formulation will only be delivered which complies with relevant local laws.

Suitably, in step (iii), said one or more colour formulations is selected having regard to at least two of said variables described in (a) to (d), preferably at least three of said variables selected from those in (a) to (d) and more preferably in relation to variables selected from each class of variables described in (a) to (d).

In step (ii), information may be communicated to the second location relating to the identity of the polymer into which the colour formulation is to be incorporated. The identity of the polymer may include the specific grade of polymer.

When a recycled polymeric material, for example PCR, is the polymeric material to be coloured in the method, the method may include determining colour information relating to the recycled polymeric material before step (iii). This may be undertaken on a small sample of the recycled polymeric material. In some cases, in general terms, the method may include analysing and/or obtaining colour information in relation to the polymeric material to be coloured in the method, even for virgin polymeric material.

In step (ii), information may be communicated to the second location relating to variables in one or more, two or more, three or more, or each of groups (a) to (d) above.

In one embodiment, the identity of the intended user of the selected colour may be determined at the first location and information relating thereto is communicated to the second location. The identity may be determined by the intended user in the first location logging into a computer system at the first location, wherein the login uniquely identifies the intended user and preferably identifies information relating to one or more of variables (a) to (d) above. More preferably, information is identified relating to a specific polymer grade used by said intended user.

Preferably, information is communicated from said first location to said second location digitally. Information is preferably communicated via a global network, for example a global computer network such as the internet.

When step (i) comprises determining the spectrum of the desired colour, information relating to the entire visible spectrum is suitably communicated to the second location. The information may be communicated as transmission or reflectance data.

Said second location is preferably owned or controlled by a company which owns or controls information relating to colour formulations which are used in the method.

Said second location is preferably arranged to receive information from a plurality, more preferably a multiplicity, of locations which suitably have any feature of the first location described. Said second location may comprise a hub arranged to communicate with a multiplicity of locations at which colour information relating to desired colours may be determined.

Computing means is preferably provided in said second location. Said computing means is preferably arranged to receive information determined in step (i) and determine a match or close match of the desired colour. Said computing means preferably includes a database which comprises information relation to a multiplicity of base colour formulations included in a colour dispense system which is arranged to be used to dispense the colour formulations in the method. Said computing means preferably includes information relating to the spectra in the visible region of each of said base colour formulations. Said computing means preferably includes information relating to properties and/or effects of said base colour formulations when incorporated into different types of plastics, for example, when incorporated into plastics selected from polyesters, polyolefins, styrenic polymers, polycarbonates and polyamides. More preferably, said computing means includes information relating to a specific polymer grade into which the non-volatile colour formulation is to be incorporated. Said computing means preferably includes a customer profile which includes details of one or more preferred specific polymer grades. This may enable selection of colour formulations which can very accurately reproduce selected colours.

Said computing means preferably includes means for determining the effect, for example the colour spectrum, resulting from mixing a plurality or a multiplicity of base colour formulations. Additionally, said computing means may be arranged to determine the effect of adding a mixture of a plurality or multiplicity of base colour formulations to different types of polymeric materials.

Said computing means preferably includes means for determining the effect of adding a mixture of a plurality or multiplicity of base colour formulations at different concentrations into a polymeric material. The computing means may also determine the concentration at which the colourant should be added and the addition rate.

In step (iii), preferably a plurality of colour formulations for delivery into a polymeric material are determined. The colour formulations may differ from each other on the basis of the closeness of their colours to the desired colour and/or their relative cost.

In step (iv), said computing means may be arranged to deliver information to the assessment location. Preferably, the method involves no manual human intervention in the process of determining the one or more colour formulations in step (iii) and delivery of information in step (iv) to said assessment location. Thus, steps (iii) and (iv) preferably occur substantially automatically.

Preferably, information is communicated from said second location to the assessment location digitally. Information is preferably communicated via a global network, for example a global computer network such as the internet.

In step (iv), information delivered may include information relating to the differences between the colour obtainable and the desired colour.

In step (iv), information delivered may include the colour spectrum of the colour obtainable. The method may include visually representing the spectra of the colour obtainable and the desired colour on the same output so the two spectra can be compared.

In step (iv), information delivered may include visualisation means for allowing the colour obtainable using a colour formulation determined in step (iii) to be visualised. Means may be provided at said assessment location to enable a display of the actual colour obtainable in a part if manufactured using the colour formulation in relation to which information has been delivered. For example, a visual display unit, suitably a colour calibrated unit arranged to provide a precise colour display, may be arranged at said assessment location for displaying the actual colour obtainable, suitably under control of said visualisation means. In step (iv), the actual colour obtainable may be displayed opposite the desired colour determined in step (i) to allow a comparison of the two colours. When information relating to a plurality of colours is delivered in step (iv), each of the actual colours obtainable may be displayed opposite the desired colour, suitably so that all of the colours can be visually compared by a person at the assessment location.

The first location and the assessment location may be one and the same. In this case, information relating to a desired colour may be determined in the first location and information relating to the colour formulation(s) determined in step (iii) may be delivered back to the first location.

In the assessment location, a person may assess information relating to the colour or colours obtainable with a view to selecting a colour formulation for use in manufacturing the part. Means may be provided in said assessment location for communicating with said second location, for example said computing means, to request changes to the colour or colours obtainable which have been delivered to the assessment location. For example, said means for communicating may be arranged to allow a person to request an increase or a decrease (e.g. more/less blue) in the colour to be determined in a repeat of step (iii) for delivery in a subsequent step (iv); or may allow a person to request a cheaper formulation. The aforementioned may be carried out in step (v).

In step (vi), a person, for example at said assessment location, may select a colour formulation and place an order for it.

According to a second aspect of the invention, there is provided an arrangement for selecting a non-volatile colour formulation for manufacturing, in a selected colour, a part comprising a polymeric material (e.g. a thermoplastic polymeric material), the arrangement comprising:

(a) at a first location, means for determining colour information relating to a desired colour for the polymeric material;
(b) at a second location, remote from said first location, means for receiving information from said first location and determining one or more colour formulations for delivery into a polymeric material (for example a thermoplastic material which is to be extruded or injection moulded) to match or closely match the desired colour;
(c) at an assessment location (which may be said first location) providing means for assessing a colour obtainable as determined at said second location; and
(d) means for selecting a colour formulation for use in the manufacture of the part.

Preferably, a spectrophotomer is provided at the first location for determining colour information.

Preferably a computing means is provided at the second location which may have any feature of the computing means of the first aspect.

According to a third aspect of the invention, there is provided a method of manufacturing a colour formulation for use in the manufacture of a part comprising a polymeric material, the method comprising using a colour dispense system which includes a multiplicity of base colour formulations to dispense predetermined amounts of said base colour formulations into a receptacle.

The colour dispense system may include more than 10, preferably more than 20, more preferably more than 25 base colour formulations. Each base colour formulation preferably is compatible with a polymeric material, for example thermoplastic polymeric material. Each colour formulation is preferably stable at a temperature at which a polymeric material (e.g. thermoplastic) which it is to colour is melt processible.

The method may comprise communicating information relating to the amounts of base colour formulations to be dispensed, suitably from a computing means as described according to the first aspect.

The method may comprise communicating information relating to the amounts of base colour formulations to be dispensed from a location which is remote from the colour dispense system. For example, the information may be communicated from the second location described in the first aspect to a remote location which may be spaced at least 10 miles, suitably at least 50 miles from the second location. The colour dispense system may be located in said first location, said assessment location or in another location remote from said second location.

The invention extends to a method of manufacturing colour formulations in a plurality, preferably at least 5, separate locations, the method comprising providing respective colour dispense systems as described in said plurality of locations and communicating information to locations in which said colour formulations are to be manufactured relating to the amounts of base colour formulations to be dispensed said information being communicated to said locations from a single computing means.

According to a fourth aspect of the invention, there is provided apparatus for manufacturing a colour formulation, the apparatus including a colour dispense system which includes a multiplicity of base colour formulations arranged to dispense predetermined amounts of colour into a receptacle.

According to a fifth aspect of the invention, there is provided an arrangement which comprises a computing means arranged to communicate information relating to the amounts of base colour formulations to be dispensed to a plurality, preferably at least 5, separate locations in which respective colour dispense systems are arranged.

According to a sixth aspect of the invention, there is provided a method of manufacturing a part comprising a polymeric material in a predetermined colour, the method comprising incorporating a colour formulation suitably manufactured and/or as described herein into a polymeric material and forming the mixture of colour formulation and polymeric material into said part in an extrusion or injection moulding process.

The method may include manufacturing a colour formulation as described according to the third aspect and/or using apparatus described according to the fourth aspect and/or using an arrangement as described according to the fifth aspect.

The method may include assessing the colour of the part manufactured and feeding information relating to its colour to the computing means described in order to allow the relationship between colours predicted by said computing means and actual colours achieved to be compared and for adjustment to the computing means to improve the relationship between its predicted colour and actual colour.

According to a seventh aspect of the invention, there is provided an arrangement comprising the arrangement of the second aspect in combination with the arrangement of the fifth aspect.

In a preferred embodiment, the arrangement of the seventh aspect comprises:

(A) a plurality, preferably at least 3, more preferably at least 5, separate locations for determining colour information relating to a desired colour for the polymeric (preferably thermoplastic) material;

(B) a single computing means communicating with said plurality of locations and being arranged to deliver information relating to colour formulations to match or closely match the desired colour;

(C) a plurality, preferably at least 3, more preferably at least 5, separate locations each of which communicates with said single computing means and each comprises a colour dispense system for manufacturing a colour formulation according to a recipe determined by said computing means.

An eighth aspect of the invention is specifically targeted at the problem of providing recycled polymeric material in a desired colour. The invention provides a method of producing a recycled material in a desired colour, the method comprising:

(a) selecting a recycled feed stock, for example comprising recyclate of different types;
(b) determining colour information relating to the feed stock;
(c) determining one or more colour formulations for delivery into the feed stock (optionally with the feed stock being combined with other materials such as virgin material), to match or closely match the desired colour.

The method of the eighth aspect may include any feature of any preceding aspect (especially of the first aspect) mutatis mutandis.

Any feature of any aspect of any invention or embodiment described herein may be combined with any feature of any aspect of any other invention or embodiment described herein mutatis mutandis.

Specific embodiments of the invention will now be described, by way of example, with reference to FIG. 1, which is a schematic drawing of a system for selecting and delivering colour formulations for use in colouring thermoplastic polymeric materials.

Manufacturing a part in a desired colour from a thermoplastic polymer may be divided into three separate elements—firstly, selection of a colour formulation to be used; secondly, manufacture of the colour formulation selected; and, thirdly, manufacture of a part using the selected colour formulation. Referring to FIG. 1, the first element is represented to the left of dashed line 2; and the second element is represented to the right. Each of the elements is described in detail below.

Referring to FIG. 1, a desired colour for a part may be determined in any of a number of first locations 4, 6, 8, 10, 12. For example, in location 4, which may be the premises of a designer or manufacturer (including a manufacturer of colourant), a customer may select a colour in which it is desired to manufacture a particular solid part, for example a part of a child's toy. The customer may have a sample or swatch of the desired colour. In this case, a sales-person, at location 4 with the customer, may scan the colour using a hand-held spectrophotometer. The entire visible and non-visible spectrum and any other relevant information (e.g. L*, a*, b*, DE etc) is then sent digitally over the internet, as represented by arrow 14, to a centralised match prediction system 16. Other information which may be sent may include information on the type of polymeric material to be coloured, customer details (e.g. an identification number etc) end use application of the part, legislatory requirements and physical properties required (this would include fastness properties processing details etc.).

The system 16 may be located at the sales person's head office or other suitable location.

The system 16 includes a database and associated software and is able to take the spectophotometric data and predict how to reproduce the colour scanned using an associated colour dispense system. The colour dispense system includes 16-70 base colours which are arranged to be mixed in varying ratios to reproduce substantially the entire Colour Space/Spectrum. Further details on the system 16 and colour dispense system are provided hereinafter.

After receiving data relating to the spectrum of the desired colour, the system 16 determines how to match the desired colour. This step may take less than 1 minute depending on computing power.

Next, information on the closest matches which can be achieved using the colour dispense system are communicated back to location 4 as represented by arrow 20. At location 4, the closest matches may then be indicated visually on a calibrated computer monitor so that the customer can see what colours can be achieved using the colour dispense system and the extent to which achievable colours differ (if they differ at all) from the desired colour. Also, system 16 may communicate additional information back to location 4. For example, spectra of achievable colours may be communicated so that such spectra may be compared with the spectrum of the desired colour. Information on how achievable colours differ from the desired colour may be communicated (e.g. achievable colour is bluer, redder, lighter, darker etc than the desired colour). Information on the cost and/or performance of formulations of achievable colours may be communicated. For example, the best match may be obtained by mixing more base colours and/or more expensive base colours and may be more expensive compared to a poorer match or a poorer performing formulation which may use cheaper base colours. The customer will be able to make a direct visual comparison between colours achievable and compare the cost of using the achievable colours in order to enable a decision to be taken on which, if any, of the achievable colours should be selected and the corresponding colour formulation purchased.

The customer may select an achievable colour at this stage. Alternatively, further information (e.g. make a particular previously communicated achievable colour bluer, redder or whatever) may be communicated back to system 16 for the generation of further achievable colours which may again be communicated to location 4.

It will be appreciated that use of the first element described allows a customer to decide on a colour and/or colour tolerance based on a series of costed options delivered digitally to him. The system enables rapid selection (e.g. in a time measured in minutes/hours rather than days) of an achievable colour and its purchase at a specific agreed price with minimal human intervention in the process—i.e. a human selects a desired colour and scans it but thereafter only receives information to enable a colour selection to be made; no samples need to be posted and no colour plaques made. In some situations, a colour check on a chosen formulation could be undertaken by the manufacturer, to the supplied colour data.

As an alternative to information being communicated between system 16 and a customer's location 4, information may be communicated between other locations in a similar manner. For example location 6 may be a colour laboratory in one country and location 8 may be a colour laboratory in another country. In these cases, customers may send colour swatches (or other information) to locations 6, 8 and personnel in these locations may scan the swatches and communicate with system 16 for obtaining information on achievable colours. The information may be forwarded by personnel at locations 6, 8 to the customer or system 16 may send the information directly to the customer. Personnel at locations 6, 8 and the customer may then communicate to select an achievable colour in a manner analogous to that described above in the context of location 4.

In some situations, a customer, for example in location 10, may carry out the steps described above with respect to location 4 without the presence of a sales-person. For example, the customer may have been provided with a spectrophotometer and means to allow communication with system 16.

In general terms, the colour dispense system comprises twenty-seven separate receptacles each of which contains a respective one of twenty-seven base colour formulations. The base colour formulations suitably comprise liquid (suitably organic liquid) dispersions of pigments or dyes. The base colour formulations are selected to be stable rheologically and colourmetrically over time (e.g. they do not significantly thicken or change or develop different colours over time) so that when incorporated into a colour formulation for addition to a polymer their colour effect is entirely predictable and that effect will not be affected by the time or temperature of dispense etc.

Each base colour formulation is provided in a respective receptacle which includes associated pipework for extracting formulation from the receptacle, circulating it and returning it to the receptacle in order to maintain the formulation as an homogenous dispersion and to avoid any setting of any particles in the formulation.

Each of the twenty-seven receptacles is connected via respective pipework to a dispense station. The dispense station is computer controlled and arranged to control the accurate dispense of fluid from the receptacles into a product receptacle in order to produce a desired colour formulation for a customer in accordance with information determined by the centralised match prediction system 16.

The system 16 is arranged to receive information on a desired colour and the polymer type to be coloured and determine the identity and amounts of base colour formulations to be dispensed by the colour dispense system taking all factors into consideration and so that the colour of the polymer into which the colourant formulation is dispensed at a specific concentration is the same as the desired colour. The system 16 include a database of information relating to each of the twenty-seven base colour formulations including information on the visible spectrum and colourmetric data of each, including colour strength, polymer type and application information. The system is able to predict, for example by combining spectral information of each formulation, what the colour effect will be when colour formulations are mixed in specific quantities. Additionally, the system includes feedback on any differences perceived in practice between predicted colour effects and actual colour when viewed in specific polymeric materials and the feedback is continuously used to optimise the predictive ability of the system 16. The system thus enables achievable colour formulations to be predicted accurately and fed back to customers. Furthermore, since the compositions of the base colour formulations associated with the dispense system are accurately controlled and maintained, any colour selected on the basis of that predicted by system 16 can effectively and accurately be reproduced when required at the dispense station. Thus, only an achievable colour actually selected by a customer is dispensed by the colour dispense system as a tangible colour formulation.

The system 16, associated dispense station and the base colour formulations should be capable of providing colour formulations for polymers which have predictable and reproducible colour effects provided the quality of the aforementioned can be assured in an appropriate Quality Assurance (QA) system. Advantageously, provided the aforementioned are in accordance with a predetermined QA system there will be no need to subject colour formulations produced to Quality Control (QC) testing. This minimises operator contact with the colour formulations and allows colour formulations to be dispensed automatically and delivered to customers without any testing of the formulations themselves. This may allow the dispense and delivery of formulations to be undertaken by relatively un-skilled operatives provided that associated QA systems have been complied with. This may allow numerous dispense stations to be easily and cheaply established in a range of locations.

Referring to the right hand side of dashed line 2 in FIG. 1, the second element in the manufacturing of a part will be described.

The system 16 communicates with a device 30 which includes software arranged to operate the colour dispense system described. A single device 30 may be centrally located (e.g. in the same location as system 16) or copies of the software may be associated with colour dispense systems wherever located. In FIG. 1 the device 30 is shown communicating with a number of dispense stations. For example, dispense stations 32, 34, 36 may be in different countries; station 38 may be at a customer's site. Each dispense station is as described above. It may include all the apparatus needed to dispense the base colour formulations in accordance with the specified QA system. Suitably, the base colour formulations may be delivered to each of the dispense stations, the formulations having been manufactured in accordance with a QA system elsewhere. The base colour formulations may carry a "use by" date to ensure when used they are of a predetermined quality. Thus, identical colour formulations can be prepared in each of the dispense stations under the effective control of the system 16 irrespective of where the colour formulation is dispensed.

Colour formulations may be dispensed from locations 32, 34, 36, 38 as applicable and shipped to customers (bubble 51). In some cases, it may be desirable to undertake QA after dispense (bubble 50) or QC (bubble 52). QC may involve moulding the colour formulation into a plastic part, comparing it with a standard part and checking viscosity and other physical attributes. QA may involve colour measurement of the colour formulation itself, and possibly a simple viscosity check. In some cases, after moulding of a part using a colour formulation, the moulded part may be assessed and information fed back to system 16 to facilitate improvements to the database and/or predictability of formulations using the system.

The third element in the manufacture of parts may be the use of the colour formulations by customers to produce coloured parts. In this case the colour formulation may be dosed into thermoplastic polymeric material which may be extruded or injection moulded to define the part.

The system described is versatile and has many potential advantages some of which have been referenced above. In addition, a customer (or a designer) may for example be in Europe and may specify a colour for a part which is formulated as described but may be dispensed in another location for example in the customer's Asian factory or in a location 32 which is close to the customer's Asian factory. In another situation, a formulation may be dispensed in locations close to several of a customers factories. In another situation, colour may be matched centrally and dispensed at a customers premises.

A system as described above with reference to FIG. 1 may be modified to provide recycled polymeric material in a desired colour. In this regard a batch of recycled material may nominally include "clear bottles" although in reality the batch may include bottles of slightly different clarity and/or colour. Furthermore, the bottles may be made from polymeric material, for example PET, of different grades and/or from different manufacturers. Thus, the recycled polymeric material may have a unique identity.

Information, for example colour information, relating to the recycled polymeric material is determined. Such information is relayed to the centralised match prediction system 16 of FIG. 1. Then, the system 16 determines how to colour the recycled material to a desired colour. This information (and/or other information referred to above) may be communicated, for example back to location 4, as described earlier.

Advantageously, the system and methodology allows recycled material to be assessed and colour matched rapidly. Furthermore, colour formulations may be dispensed in relatively small quantities and used to colour relatively small quantities of recycled materials. Thus, the system offers the flexibility to colour batches of recycled material in different colours.

The invention claimed is:

1. A method of selecting and manufacturing a non-volatile colour formulation for manufacturing, in a selected desired colour, a part comprised of a polymeric material, the method comprising the steps of:
   (i) at a first location, selecting the desired colour for the polymeric material;
   (ii) communicating the colour selected in step (i) to a centralised colour match prediction system;
   (iii) at the centralised colour match prediction system, determining, via a computer, one or more non-volatile colour formulations for delivery into a polymeric material to match or closely match the desired colour, wherein said one or more non-volatile colour formulations is selected with regard to one or more of the following variables:
      (a) the identity of the polymer into which the non-volatile colour formulation is to be incorporated,
      (b) the grade of polymer into which the non-volatile colour formulation is to be incorporated,
      (c) the processing conditions to which the polymer into which the non-volatile colour formulation is to be incorporated will be subjected, and
      (d) country of use;
   (iv) delivering information through said computer relating to the non-volatile colour formulation(s) determined in step (iii) to an assessment location for assessment;
   (v) optionally repeating step (iii) to determine one or more additional non-volatile colour formulations for delivery into the polymeric material to match or closely match the desired colour; and
   (vi) selecting a colour formulation for use in the manufacture of the part;
   (vii) wherein the centralised colour match prediction system communicates with a device which includes software arranged to operate a colour dispense system, wherein said colour dispense system includes more than ten base colour formulations which include liquid dispersions of pigments or dyes; and
   (viii) wherein the non-volatile colour formulation is manufactured using one of said colour dispense system.

2. A method according to claim 1, wherein said polymeric material is a thermoplastic polymeric material.

3. A method according to claim 1, wherein said non-volatile colour formulation comprises a non-volatile carrier and one or more pigments or dyes.

4. A method according to claim 1, wherein the colour formulation is for use in manufacturing a coloured part comprising a polymeric material in a process that comprises heating a mixture of a said colour formulation and polymeric material to allow the mixture to be shaped to define the part.

5. A method according to claim 1, wherein in step (i) of the method, colour is determined by selecting an identifier of a colour in accordance with a defined colour system or a colour spectrum of the desired colour is determined.

6. A method according to claim 1, wherein in step (i), the desired colour is selected spectrophotometrically.

7. A method according to claim 1, wherein said variables further include:
   (e) the use and/or requirements of the part for which the colour formulation is to be selected.

8. A method according to claim 7, wherein, in step (ii), information is communicated to the second location relating to the identity of the polymer into which the colour formulation is to be incorporated.

9. A method according to claim 1, wherein the polymeric material is a recycled polymeric material and the method includes determining colour information relating to the recycled polymeric material before step (iii).

10. A method according to claim 1, wherein the identity of the intended user of the selected colour is determined at the first location and information relating thereto is communicated to the second location.

11. A method according to claim 1, wherein the computer is arranged to receive information determined in step (i) and determine a match or close match of the desired colour, said computer including a database which comprises information relating to the spectra in the visible region of each of a plurality of base colour formulations.

12. A method according to claim 11, wherein said computer includes information relating to properties and/or effects of said base colour formulations when incorporated into different types of polymeric materials.

13. A method according to claim 12, wherein said computer is configured to determine the effect of adding a mixture of a plurality or multiplicity of base colour formulations at different concentrations into a polymeric material.

14. A method according to claim 8, wherein, in step (iii), a plurality of colour formulations for delivery into a polymeric material are determined.

15. A method according to claim 1, wherein in step (iv), information delivered includes information relating to the differences between the colour obtainable and the desired colour.

16. A method according to claim 1, wherein a display device is provided at said assessment location to enable a display of the actual colour obtainable in a part if manufactured using the colour formulation in relation to which information has been delivered.

17. A method according to claim 1, wherein in the assessment location, a person may assess information relating to the colour or colours obtainable with a view to selecting a colour formulation for use in manufacturing the part.

18. A method of manufacturing a part comprising a polymeric material in a predetermined colour, the method comprising incorporating a colour formulation selected and manufactured in a method according to claim 1 into a polymeric material and forming a mixture of colour formulation and polymeric material into said part in an extrusion or injection moulding process.

19. A method according to claim 1, wherein the more than ten base colour formulations are manufactured in accordance with a quality assurance system so that identical colour formulations can be prepared in each colour dispense system under the effective control of said computer.

20. A method according to claim 1, wherein at least three of said colour dispense systems are provided at separate locations, the method further comprising the step of arranging said computer to communicate information to said colour dispense systems on the amounts of base colour formulations to be dispensed so that identical colour formulations can be prepared in each colour dispense system under the effective control of said computer.

21. A method according to claim 1, wherein said computer of said colour match prediction system includes a database which comprises information in relation to the base colour formulations included in said colour dispense systems.

22. An arrangement for selecting and manufacturing a non-volatile colour formulation for manufacturing, in a selected colour, a part comprised of a polymeric material, the arrangement comprising:
  (a) at a first location, a device configured to determine the desired colour for the polymeric material;
  (b) a centralised colour match prediction system, at a second location, remote from said first location, said centralised colour match prediction system including a computer receiving information from said first location and an associated software determining one or more non-volatile colour formulations for delivery into a polymeric material to match or closely match the desired colour, wherein said one or more non-volatile colour formulations is selected having regard to one or more of the following variables:
    (i) the identity of the polymer into which the non-volatile colour formulation is to be incorporated,
    (ii) the grade of polymer into which the non-volatile colour formulation is to be incorporated,
    (iii) the processing conditions to which the polymer into which the non-volatile colour formulation is to be incorporated will be subjected, and
    (iv) country of use;
  (c) at an assessment location, a display unit for assessing a colour obtainable as determined by said centralised colour match prediction system at said second location;
  (d) a selection device arranged to allow selection of a non-volatile colour formulation for use in the manufacture of the part; and
  (e) a colour dispense system which includes more than ten base colour formulations which include liquid dispersions of pigments or dyes;
  (f) wherein the centralised colour match prediction system communicates with a device which includes software arranged to operate said colour dispense system and dispense predetermined amounts of said base colour formulations into a receptacle.

23. An arrangement according to claim 22, wherein a spectrophotometer is provided at the first location for determining the desired colour.

24. An arrangement according to claim 22, wherein the more than ten base colour formulations are manufactured in accordance with a quality assurance system so that identical colour formulations can be prepared in each colour dispense system under the effective control of said computer.

25. An arrangement according to claim 22, wherein at least three of said colour dispense systems are provided at separate locations, and wherein the computer is arranged to communicate information to said colour dispense systems on the amounts of base colour formulations to be dispensed so that identical colour formulations can be prepared in each colour dispense system under the effective control of said computer.

26. An arrangement according to claim 22, wherein said computer of said colour match prediction system includes a database which comprises information in relation to the base colour formulations included in said colour dispense systems.

27. A method of manufacturing colour formulations in a plurality of separate locations, the method comprising providing respective colour dispense systems in said plurality of locations, wherein each said colour dispense system comprises more than ten base colour formulations arranged to be dispensed in predetermined amounts into a receptacle, said base colour formulations comprising liquid dispersions of pigments or dyes; and
  communicating information to said colour dispense systems in locations in which said colour formulations are to be manufactured relating to the amounts of base colour formulations to be dispensed, said information being communicated to said locations from a single computer, wherein said computer includes a centralized colour match prediction system for determining one or more non-volatile colour formulations for delivery into a polymeric material to match or closely match a desired colour.

28. A method according to claim 27, wherein the more than ten base colour formulations are manufactured in accordance with a quality assurance system so that identical colour formulations can be prepared in each colour dispense system under the effective control of said computer.

29. A method according to claim 27, wherein at least three of said colour dispense systems are provided at separate locations, the method further comprising the step of arranging said computer to communicate information to said colour dispense systems on the amounts of base colour formulations to be dispensed so that identical colour formulations can be prepared in each colour dispense system under the effective control of said computer.

30. A method according to claim 27, wherein said computer includes a database which comprises information in relation to the base colour formulations included in said colour dispense systems.

31. A method of selecting and manufacturing a non-volatile colour formulation for manufacturing a part comprising a polymeric material in a selected desired colour, the method comprising the following steps:
  (i) at a first location, determining the desired colour for the polymeric material;
  (ii) communicating the desired colour determined in step (i) to a centralized colour match prediction system;
  (iii) at the centralised colour match prediction system, determining, via a computer, one or more non-volatile colour formulations for delivery into a polymeric material to match or closely match the desired colour;
  (iv) delivering information through the computer relating to the non-volatile colour formulation(s) determined in step (iii) to an assessment location for assessment;
  (v) optionally repeating step (iii) to determine one or more additional non-volatile colour formulations for delivery into the polymeric material to match or closely match the desired colour;
  (vi) selecting a non-volatile colour formulation for use in the manufacture of the part; and
  (vii) manufacturing said non-volatile colour formulation in a method comprising using a colour dispense system which includes more than ten base colour formulations to dispense predetermined amounts of said base colour formulations into a receptacle, wherein said computer communicates information to the colour dispense system relating to the amounts of said base colour formulations to be dispensed, and wherein said ten base colour formulations include liquid dispersions of pigments or dyes.

32. A method according to claim 31, wherein the more than ten base colour formulations are manufactured in accordance with a quality assurance system so that identical colour formulations can be prepared in each colour dispense system under the effective control of said computer.

33. A method according to claim 31, wherein at least three of said colour dispense systems are provided at separate locations, the method further comprising the step of arranging said computer to communicate information to said colour dispense systems on the amounts of base colour formulations to be dispensed so that identical colour formulations can be prepared in each colour dispense system under the effective control of said computer.

34. A method according to claim 31, wherein said computer of said colour match prediction system includes a database which comprises information in relation to the base colour formulations included in said colour dispense systems.

35. A method of selecting and manufacturing a non-volatile colour formulation for manufacturing, in a selected desired colour, a part comprising a polymeric material, the method comprising the steps of:
  (i) at a first location, determining the desired colour for the polymeric material;
  (ii) communicating the desired colour determined in step (i) to a centralised colour match prediction system;
  (iii) at the centralised colour match prediction system, determining, via a computer, one or more non-volatile colour formulations for delivery into a polymeric material to match or closely match the desired colour;
  (iv) delivering information through the computer relating to the non-volatile colour formulation(s) determined in step (iii) to an assessment location for assessment, wherein said information includes a series of costed options as regards to colour and/or colour tolerance;
  (v) optionally repeating step (iii) to determine one or more additional non-volatile colour formulations for delivery into the polymeric material to match or closely match the desired colour; and
  (vi) selecting the non-volatile colour formulation for use in the manufacture of the part;
  (vii) wherein the centralised colour match prediction system communicates with a device which includes software arranged to operate a colour dispense system, wherein said colour dispense system includes more than ten base colour formulations which include liquid dispersions of pigments or dyes;
  (viii) wherein the non-volatile colour formulation is manufactured using said colour dispense system.

36. A method according to claim 35, which includes manufacturing the part using the colour formulation, assessing the colour of the part manufactured and feeding information relating to its colour to the computer in order to allow the relationship between colours predicted by said computer and actual colours achieved to be compared and for adjustment to the computer to improve the relationship between its predicted colour and actual colour.

37. A method according to claim 35, wherein the more than ten base colour formulations are manufactured in accordance with a quality assurance system so that identical colour formulations can be prepared in each colour dispense system under the effective control of said computer.

38. A method according to claim 35, wherein at least three of said colour dispense systems are provided at separate locations, the method further comprising the step of arranging said computer to communicate information to said colour dispense systems on the amounts of base colour formulations to be dispensed so that identical colour formulations can be prepared in each colour dispense system under the effective control of said computer.

39. A method according to claim 35, wherein said computer of said colour match prediction system includes a database which comprises information in relation to the base colour formulations included in said colour dispense systems.

40. A method of selecting and manufacturing a non-volatile colour formulation for manufacturing, in a selected desired colour, a part comprised of a polymeric material, the method comprising the steps of:
  (i) at a first location, selecting the desired colour for the polymeric material;
  (ii) communicating the colour selected in step (i) to a centralised colour match prediction system;
  (iii) at the centralised colour match prediction system, determining, via a computer, one or more non-volatile colour formulations for delivery into a polymeric material to match or closely match the desired colour, wherein said one or more non-volatile colour formulations is selected with regard to one or more of the following variables:
    (a) the identity of the polymer into which the non-volatile colour formulation is to be incorporated,
    (b) the grade of polymer into which the non-volatile colour formulation is to be incorporated,
    (c) the processing conditions to which the polymer into which the non-volatile colour formulation is to be incorporated will be subjected, and
    (d) country of use;
  (iv) delivering information through said computer relating to the non-volatile colour formulation(s) determined in step (iii) to an assessment location for assessment;
  (v) optionally repeating step (iii) to determine one or more additional non-volatile colour formulations for delivery into the polymeric material to match or closely match the desired colour; and
  (vi) selecting the non-volatile colour formulation for use in the manufacture of the part;
  (vii) wherein the centralised colour match prediction system communicates with a device which includes software arranged to operate a colour dispense system, wherein said colour dispense system includes more than ten base colour formulations which include liquid dispersions of pigments or dyes;
  (viii) wherein the centralised colour match prediction system communicates the colour formulation selected in step (vi) after the assessment in step (iv) to a device which includes software arranged to receive the colour formulation without human intervention and to operate a computer controlled colour dispense system with information determined by the centralised match prediction system, wherein said colour dispense system includes more than ten base colour formulations as fluid in receptacles to be accurately dispensed according to the colour formulation selected in step (vi);
  (ix) wherein the non-volatile colour formulation is manufactured using said colour dispense system.

* * * * *